Patented June 20, 1944

2,351,843

UNITED STATES PATENT OFFICE 2,351,843

NITRATE ESTERS OF XANTHINE DERIVATIVES AND PROCESS OF MAKING THEM

John H. Speer, Skokie, Ill., assignor to G. D. Searle & Co., Chicago, Ill., a corporation of Illinois No Drawing. Application March 6, 1942,
Serial No. 433,638

4 Claims. (Cl. 260—256)

This invention relates to a series of new nitrate esters of 1,3-dialkyl-7-hydroxymethyl xanthines, and to a process for preparing these esters. The new esters described and claimed herein are represented by the formula

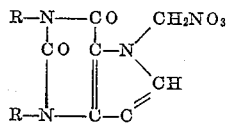

wherein R stands for an alkyl group containing not more than four carbon atoms. These esters are all white, crystalline substances which are relatively insoluble in water whether neutral or slightly acid or slightly alkaline. They are soluble in and may be recrystallized from alcohol and other organic solvents.

Nitrate esters of simple aliphatic and aromatic substituted aliphatic alcohols have been made in many instances in the prior art. Nitrate salts of a number of alkaloids are also commonly known but, so far as I am aware, no one has prepared or described a nitrate ester of an alkaloid, particularly of an alkylated xanthine derivative, prior to my present invention and to that described in my copending application, Serial No. 433,639, filed March 6, 1942. These nitrate esters herein described are completely different from the nitrate salts of alkaloids in that they are un-ionized, are very sparingly soluble in water, and can be separated into nitric acid and the parent alkaloid only by chemical hydrolysis.

The esters of the present invention cannot be made by direct esterification of the corresponding hydroxy-compound, but are best prepared from the corresponding chlorine derivative by treatment with silver nitrate. The chlorine derivative in turn can be prepared from the corresponding 1,3-dialkyl xanthine by treating it with strong formaldehyde solution on a steam bath, cooling to crystallize the hydroxymethyl compound thus formed, and treating the dried hydroxymethyl derivative with thionyl chloride in chloroform solution. The following example is illustrative of this method of preparation but is not to be construed as limiting this invention in any way.

*Example.*—100 grams of theophylline (1,3-dimethyl-xanthine) are heated with 300 cubic centimetres of commercial (37%) formaldehyde solution on a steam bath for several hours. The product which crystallizes on cooling (7-hydroxymethyl theophylline, melting point around 165° centigrade with decomposition) is dried in a vacuum desiccator. Ten parts by weight of this material are suspended in twenty parts by volume of chloroform and three and seven-tenths (3.7) parts by weight of pyridine, and treated with six and one-tenth (6.1) parts by weight of thionyl chloride, with cooling to prevent undue rise of temperature. The mixture is then warmed under a reflux condenser for about one-half hour, after which all volatile material is removed by vacuum distillation. The residue is crystallized from alcohol. The 7-chloromethyl theophylline thus obtained melts, when purified, at 156–157° C.

Ten parts by weight of 7-chloromethyl theophylline, eight parts by weight of silver nitrate and twenty parts by volume of absolute alcohol are heated with stirring under a reflux condenser for about an hour. The hot suspension is filtered and the filtrate on cooling deposits the nitrate ester of 7-hydroxymethyl theophylline. This may be purified by crystallization from absolute alcohol or isopropanol, and, when so purified, melts at 150° C. with decomposition.

The procedure of the above example may be followed for other 1,3-dialkyl xanthines with only such minor changes of conditions as will be apparent to one skilled in the art. For instance, when applied to 1,3-dibutyl xanthine (which contains the largest alkyl groups contemplated in this invention), a crystalline hydroxylmethyl compound which melts at 72–73° C. is obtained, from which the chloro derivative (which melts at 78–80° C.) can be prepared by the method of the example. This is in turn converted to the desired nitrate ester by silver nitrate in ethanol solution, the purified nitrate ester melting at 95° C.

The esters of this invention are white crystalline solids, stable when dry, but rather easily hydrolyzed by moisture or aqueous solution to yield as a final product the dialkyl xanthine from which the ester was originally derived. These esters are particularly useful in therapeutics, causing a marked and prolonged fall in blood pressure in both experimental animals and human beings. This action appears to be due to the ester rather than to possible products of its hydrolysis within the organism, since its magnitude is substantially greater than that produced by the parent dialkyl xanthine. Such an effect is particularly surprising in view of the relative insolubility of these esters in water solution. The acute toxicity of these esters in experimental animals is well below the effective dose, affording an excellent therapeutic index. Doses of effective size (one grain every two to four hours) to human patients have produced satisfactory and beneficial results and have not caused any untoward toxic symptoms.

I claim:

1. A new composition of matter consisting of the nitrate esters of 1,3-dialkyl-7-hydroxymethyl xanthines having the formula:

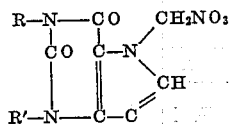

wherein R and R' each represent an alkyl group containing not more than four carbon atoms.

2. A new composition of matter consisting of the nitrate ester of 7-hydroxymethyl theophylline, having the formula:

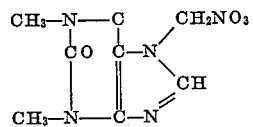

3. A process for preparing the nitrate esters of 1,3 - dialkyl - 7 - hydroxymethyl xanthines, which process comprises the step of causing silver nitrate to react upon a 1,3-dialkyl-7-chloromethyl xanthine.

4. A process for preparing the nitrate ester of 7 - hydroxymethyl theophylline, which process comprises the step of causing silver nitrate to react upon 7-chloromethyl theophylline.

JOHN H. SPEER.